United States Patent [19]

Ogawa

[11] Patent Number: 5,020,019
[45] Date of Patent: May 28, 1991

[54] DOCUMENT RETRIEVAL SYSTEM

[75] Inventor: Yasushi Ogawa, Yokohama, Japan

[73] Assignee: Ricoh Company, Ltd., Japan

[21] Appl. No.: 528,490

[22] Filed: May 25, 1990

[30] Foreign Application Priority Data

May 29, 1989 [JP] Japan .................................. 1-132696
Jul. 25, 1989 [JP] Japan .................................. 1-190519

[51] Int. Cl.[5] .......................... G06F 15/40; G06F 7/22
[52] U.S. Cl. ..................................... 364/900; 364/963
[58] Field of Search ... 364/200 MS File, 900 MS File, 364/419, 513

[56] References Cited

U.S. PATENT DOCUMENTS

| | | | |
|---|---|---|---|
| 4,255,796 | 3/1981 | Gabbe et al. | 364/900 |
| 4,276,597 | 6/1981 | Dissly et al. | 364/900 |
| 4,542,477 | 9/1985 | Noyori et al. | 364/900 |
| 4,554,631 | 11/1985 | Reddington | 364/300 |
| 4,555,774 | 11/1985 | Bernstein | 364/900 |
| 4,587,635 | 5/1986 | Hashimoto et al. | 364/900 |
| 4,611,298 | 9/1986 | Schuldt | 364/900 |
| 4,625,295 | 11/1986 | Skinner | 364/900 |
| 4,633,393 | 12/1986 | Rundell | 364/200 |
| 4,650,349 | 3/1987 | Westreich | 364/900 |
| 4,748,439 | 5/1988 | Robinson et al. | 364/513 |
| 4,803,642 | 2/1988 | Muranaga | 364/513 |
| 4,823,306 | 4/1989 | Barbic et al. | 364/900 |
| 4,849,898 | 7/1989 | Adi | 364/419 |
| 4,868,733 | 9/1989 | Fujisawa et al. | 364/200 |

OTHER PUBLICATIONS

Myamoto et al, "Generation of a Pseudothesaurus for Information Retrieval Based on Cooccurrences and Fuzzy Set Operations," *IEEE Transactions on Systems, Man, Cybernetics*, vol. SMC-13, No. 1, Jan./Feb. 1983, pp. 62-70.

Kousuke et al, "String Matching Hardware Architecture," *Denshi Tsushin Gakkai Kenkyo Hokoku*, CPSY 86-57, Jul. 1986, pp. 57-68.

Miyake et al, "Generation of Descriptor Relations of a Database Based on Fuzzy Sets and Application to Information Retrieval," 4th Fuzzy System Symposium, Tokyo, May 30-31, 1988, pp. 309-313.

Atsushi Tamura et al, "An Automatic Document Classification Method Based on the Keyword Frequency Analysis," *Information Processing Society of Japan*, 36th National Convention's Papers, 1988, 1st Term, pp. 1305 and 1306.

Hayashi, "Quantitative Method," *Toyo Keizai Shinbunsha* 1974, pp. 27-36.

*Primary Examiner*—Michael R. Fleming
*Assistant Examiner*—Gopal C. Ray
*Attorney, Agent, or Firm*—Mason, Fenwick & Lawrence

[57] ABSTRACT

A document retrieval system which includes a keyword connection table making section, a document accuracy calculating section, a document sorting section and a learning control section. The document accuracy calculating section calculates a document accuracy for each of the output documents in a prescribed manner by reference to a keyword connection table file. The document sorting section sorts the output documents in downward sequential order of the document accuracy. The learning control section serves to modify the weight of each keyword connection in a prescribed manner after the sorted output documents are given responsive to a query by a user, allowing the user make an evaluation on whether each document accuracy of the output documents is in conformity with the query. The document retrieval system is capable of providing the user with multiple choices from a numerical value between 0 and 1 in terms of a real number in making an evaluation on whether each document accuracy of the output documents is actually in conformity with the query.

8 Claims, 2 Drawing Sheets

DOCUMENT RETRIEVAL SYSTEM

CROSS-REFERENCE TO RELATED APPLICATION

U.S. Ser. No. 296,769, filed Jan. 13, 1989, entitled "DOCUMENT RETRIEVAL SYSTEM;", U.S. Ser. No. 405,122, filed Sept. 11, 1989, entitled "VARIABLE LENGTH CHARACTER STRING DETECTION APPARATUS;" and U.S. Ser. No. 593,817, filed Oct. 5, 1990, entitled "KEYWORD ASSOCIATIVE DOCUMENT."

BACKGROUND OF THE INVENTION

The present invention relates generally to document retrieval systems, and more particularly to a document retrieval system which allows a user to retrieve relevant documents being aligned in sequential order of a document accuracy, so that the user can modify the order of the aligned documents by giving instructions to the system for achieving a flexible, speedy document retrieval.

In conventional document retrieval systems, a registration operator gives inputs of appropriate keywords when a document is newly registered in the document retrieval system, and registers the document with such keywords. When retrieving a document, a user selects suitable keywords from a thesaurus and attempts a retrieval in the document retrieval system. Such a method is capable of performing a speedy retrieval, but there are some problems including, for example, the suitability of the keywords selected by the registration operator, the burdensome task of keyword classification and updating with the thesaurus, the need to retry finding any documents which nearly meet but do not fully satisfy a query given by the user, etc.

One method for eliminating such kinds of problems is disclosed, for example, in "Generation of Descriptor Relations of a Database Based on Fuzzy Sets and Application to Information Retrieval", a published article by T. Miyake et al. at the 4th Fuzzy System Symposium held on May 30-31, 1988 in Tokyo, Japan. In the method shown in this published article, a numerical expression is used to represent the relationships among keywords. However, this published article does not deal with a learning function and the proposed method is not adequate for a document retrieval system for practical use.

For the purpose of eliminating the drawbacks of the prior art described above, a document retrieval system is proposed by the same applicant. Using a numerical expression of keyword connections representing relationships among keywords, a document accuracy is adapted to this conventional document retrieval system. The document accuracy is obtained by the document retrieval system with a value of a keyword connection which becomes greater as the contents of the searched document become closer to what is sought by the user. This enables the user to find out a more closely related document in a flexible manner among those which meet the user's requests.

The prior art system discussed above employs a keyword connection which is a measure of indicating a degree of relations among keywords. The document accuracy is calculated from a set of keywords indexed to the registered documents in a database file of the system and from the query containing a set of keywords, and the document accuracy for each document is displayed. The more approximate to the query the contents of each document are, the greater the document accuracy becomes. However, this prior art system has no learning function which allows the subsequent retrieval results to reflect modifications made by the user with respect to the previous retrieval results.

In addition, an improved document retrieval system is proposed by the same applicant. This document retrieval system has a learning function, that is, the system receives a value from the user who makes a decision on whether each of the output documents are in conformity with what is initially sought by the user, then the system modifies the weight assigned to each of the keyword connections in response to the value, and this document retrieval system therefore allows the subsequent retrieval results to reflect the value previously given by the user. In the conventional document retrieval system discussed above, an evaluation function is introduced which helps describe the difference of the document accuracy of each document searched from the value given by the user with a binary expression of one or zero. The value is given by the user with the binary expression of one or zero, that is, "one" meaning that the searched document is in conformity with the query and "zero" indicating that it is not in conformity. And this document retrieval system has a learning function which serves to make a difference obtained from the evaluation function smaller. However, this conventional system has difficulty handling an ambiguous decision by the user because the user has no choice other than the two inputs of one and zero when making an evaluation on whether the previous outputs from the system are in conformity with the query.

Generally, the user does not necessarily have a clear answer regarding the suitability of the searched documents, and so the user is often unable to immediately make a yes-or-no decision on whether an output document is in conformity with his request. It is difficult for the prior art document retrieval system to provide the user with the ability to make flexible choices when the user seeks to give such a vague input to the system.

SUMMARY OF THE INVENTION

Accordingly, it is a general object of the present invention to provide a novel and useful document retrieval system in which the above described problems are eliminated.

Another and more specific object of the present invention is to provide a document retrieval system which improves the evaluation function to allow the input involving vague meanings, such as "being nearly satisfied", "being not well suited", etc., given by the user about the retrieval results.

Still another object of the present invention is to provide a document retrieval system which has a learning function acting to make a difference between the document accuracy by the document retrieval system and the input value by the user smaller through the use of an improved evaluation function.

To achieve the above and other objectives, the present invention provides a document retrieval system having a keyword connection table making section and a document selecting section, the keyword connection table making section serving to make a keyword connection table which describes the weight of each keyword connection among a first set of keywords from each of documents registered in a database file and upon request the keyword connection table making section acting to update the weight of a keyword connection pre-recorded on a keyword connection table file to make a new keyword connection table containing the modified weight of the keyword connection, and the document selecting section which selects output documents from the database file by reference to the keyword connection table file, the output documents being in conformity with a query containing a second set of keywords initially given by a user. The document retrieval system further comprises a document accuracy calculating part for calculating a document accuracy which is obtained with the weight of each keyword connection between a third set of keywords from a document of the output documents and the second set of the keywords from the query, a document sorting part for sorting the output documents in downward sequential order of the document accuracy computed by the document accuracy calculating part, and a learning control part for serving to modify the weight of each keyword connection in a prescribed manner after the output documents are given in downward sequential order of the document accuracy, allowing the user to make an evaluation on whether the document accuracy of each output document being given from the document accuracy calculating part is in conformity with the query. The document accuracy calculating part calculates the document accuracy for each output document in a prescribed manner by reference to the keyword connection table, and therefore the document retrieval system is capable of providing the user with multiple choices from a numerical value between 0 and 1 in terms of a real number in making an evaluation on whether each document accuracy of the output documents is in conformity with the query, the multiple choices including the two choices of binary 1 and 0 values which show two distinctly opposed answers to the query, 1 being in conformity with the query and 0 not being in conformity. According to the present invention, it is possible for the user to give a value with respect to the document accuracy of each output document in multiple ways, allowing the subsequent retrieval results to reflect a somewhat ambiguous evaluation. In addition, according to the present invention, some documents which are previously sought by the user are placed at higher positions of the document database file while other documents previously regarded as unnecessary are placed at lower positions thereof, thereby allowing an efficient document retrieval.

Other objects and further features of the present invention will become apparent from the following detailed description when read in conjunction with the accompanying drawings.

DESCRIPTION OF THE PREFERRED EMBODIMENT

First, a description will be given of a keyword connection employed in a preferred embodiment of this invention. In this respect, a document accuracy is defined for each document to indicate that a searched document has a value which becomes greater as the contents of the searched document become closer to what is initially sought by the user. With the document accuracy values given, the user can flexibly select a document meeting his request in an interactive manner by reference to the previous values of the document accuracy presented from the document retrieval system.

A keyword connection is used in this document retrieval system to describe a relationship between keywords. A value of a keyword connection is considered to be in a range between 0 and 1 in terms of a real number. In this respect, "0" shows the keywords regarded as having no relationship therebetween, and "1" denotes those having the closest relationship. Any value of the keyword connection greater than 0 and smaller than 1 shows the degree of the connection between the keywords. And, the degree of the connection between the i-th keyword among a first set of keywords and the j-th keyword among a second set of keywords is expressed as $Wi[Kj]$, or more simply as $Wij$. This is hereinafter referred to as the weight of a keyword connection.

Figure 1:
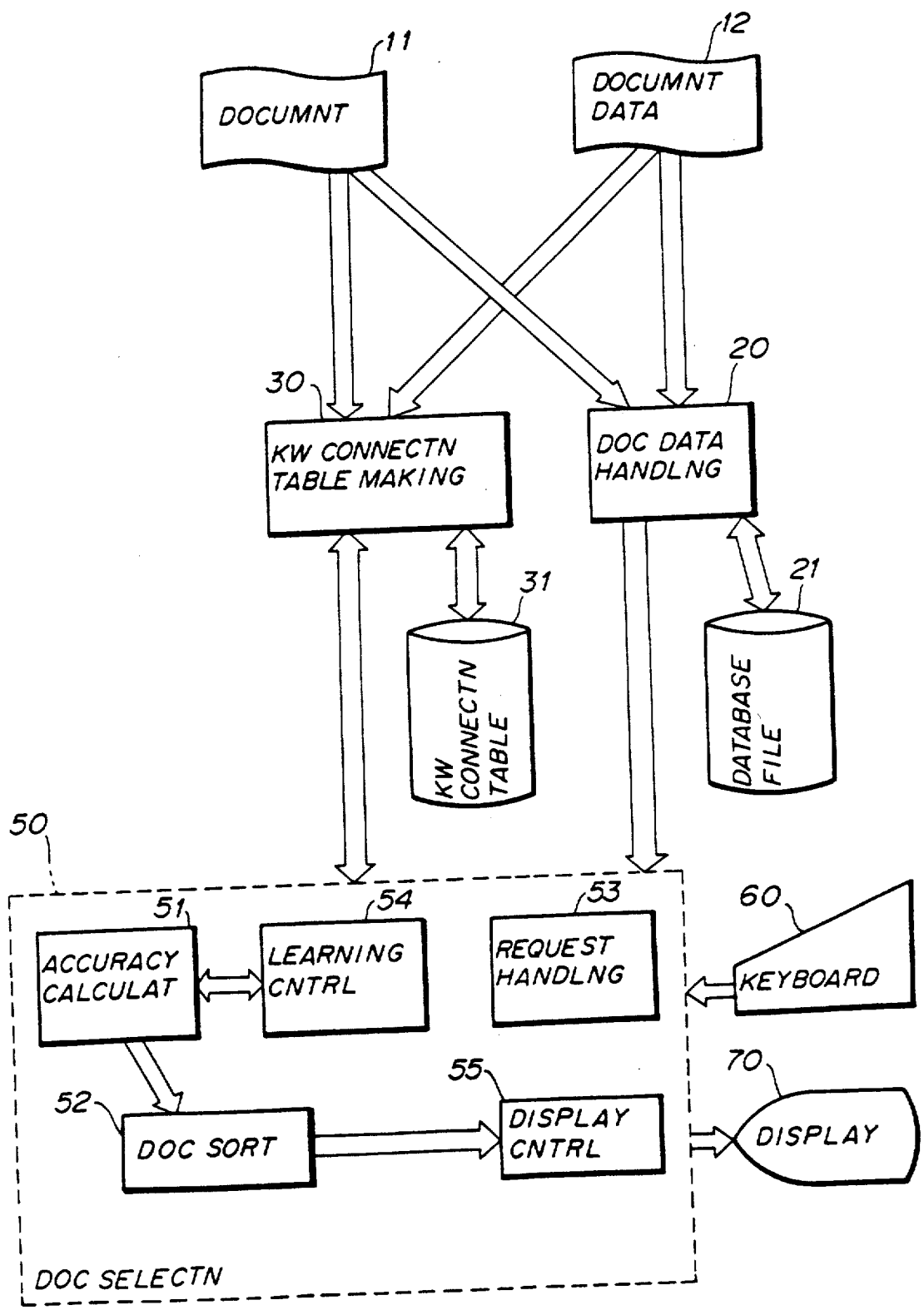
FIG.1 is a system block diagram of an embodiment of a document retrieval system according to the present invention.

Referring now to FIG.1, a description will be given of a preferred embodiment of a document retrieval system according to the present invention. A document data handling section 20 serves to store the keywords and document data 12 in a document database file 21, and arranges the document database file 21 in a form that the document retrieval system and the user can readily make use of when a document retrieval is carried out. A keyword connection table making section 30 makes a keyword connection table in which necessary keywords and keyword connections (hereinafter referred to as relation data) are described, and stores the keyword connection table in a keyword connection table file 31. In addition, in reply to a request made from a request handling section 53, the keyword connection table making section 30 acts to modify the weight of the relation data to be stored in the keyword connection table file 31.

A document selecting section 50 includes an accuracy calculating part 51, a document sorting part 52, the request handling part 53, a learning control part 54 and a display control part 55. The accuracy calculating part 51 calculates the document accuracy of each document using necessary data from the keyword connection table file 31 and the database file 21 in accordance with a query transferred from the request handling part 53. A procedure for calculating a document accuracy in more detail will be described later.

The document sorting part 52 sorts documents in the document database file 21 in downward sequential order of the document accuracy calculated by the accuracy calculating part 51, and transfers the results of the sorted documents to the display control part 55. The display control part 55 permits the retrieval results to be displayed on a display device 70 in accordance with instructions from the request handling part 53. The learning control part 54 carries out a learning of keyword connection weight values in accordance with the user instructions given from the request handling part 53. In the learning control part 54, a change in the weight of keyword connections is calculated, but actually making changes in the weight of the keyword connections for the keyword connection table file 31 is performed by the keyword connection table making part 30. A learning process used in the present invention will be described below.

The request handling part 53 transfers a query given by the user from a keyboard 60 to the accuracy calculating part 51 for achieving a retrieval of documents meeting such user requests. In addition, the request handling part 53, when requested, gives a direction to the keyword connection table making part 30 to modify the weight of the relation data with respect to a final set of the keywords.

The purpose of document retrieval is to find and bring back appropriate documents in accordance with the user requests and display the results to the user. Document selection is carried out in the document selecting section 50. A retrieval condition is given with a selection of keywords and a fixed condition of other document data. Before the keyword selection is checked, a decision is made on whether the fixed condition of other document data is suitable. If a document meets the condition of other document data, the document accuracy of the document is calculated. If the condition is not met, calculation is not performed and zero is set as the document accuracy of the document. The keyword selection is carried out by the user to provide the document retrieval system with a query indicating what information the user seeks. The query is either a single keyword or a combination of keywords joined with logical sum operators "OR". The combination of keywords joined with "OR" is used especially when no single keyword expressing exactly what is sought by the user is found in the document retrieval system.

Next, a description will be given of a procedure for calculating the document accuracy of each document with respect to a query from the user. The accuracy calculating part 51 of the document selection section 50 performs this calculation. An algebraic sum ($\oplus$) of weights with respect to keyword connections which is used in calculating a document accuracy is defined as follows:

$$x \oplus y = x + y - xy = 1 - (1 - x)(1 - y) \quad (1)$$

$$\oplus_j X_j = X_1 + X_2 + \ldots + X_n = 1 - \Pi_j (1 - X_j) \quad (2)$$

A document accuracy primarily is a numerical value which indicates the degree of relation between a document searched by the system and a query given by the user. It should be noted that the method of learning of keyword connections according to the present invention is limited to those cases where a query including a single keyword or a logical sum of combined keywords is provided by the user before retrieval. In this respect, an algebraic sum of weights of keyword connections with respect to a set of keywords included in the query is first calculated. Next, an algebraic sum of the calculated results with respect to a set of keywords indexed to the i-th document is calculated, which is determined as the document accuracy:

$$Bi = \bigoplus_{j \in KL(i)} \bigoplus_{k \in QUERY} Wjk$$

In the above formula, j is a keyword element among a set of keywords KL(i) indexed to the i-th document to which attention is paid, and k is a keyword element among a set of keywords (hereinafter referred to as a QUERY) contained in the query. Substituting (2) into the above formula makes the following formula:

$$Bi = 1 - \pi_{j \in KL(i)} \pi_{k \in QUERY} (1 - Wjk)$$

After calculation of each document accuracy for all the documents involved is finished by the accuracy calculating part 51 of the document selecting section 50, the documents are sorted by the document sorting section 52 in high-to-low sequential order of the document accuracy. Then the results are sent to the display control part 55 so that they appear on the display device 70 in a form that the user can look up.

The weights of the keyword connections in the learning process of the present invention are limited to a real number in a range between 0 and 1, and the value of the weight is fixed to 1 in a particular case where j=k.

Next, a description will be given of a learning process of the keyword connections according to the present invention. An evaluation function E is defined to describe the difference of a document accuracy from what is sought by the user. In the learning process according to the present invention, the weight of a keyword connection is modified so as to make the value of the evaluation function smaller.

$$Wmn = \begin{cases} 1 & (1 < Wmn + \alpha \Delta Wmn) \\ Wmn + \alpha \Delta Wmn & (0 \leq Wmn + \alpha \Delta Wmn \leq 1) \\ 0 & (Wmn + \alpha \Delta Wmn < 0) \end{cases} \quad (3)$$

In this formula, Wmn is a weight of the keyword connection between the m-th keyword and the n-th keyword, and $\alpha$ is a learning coefficient having a positive value to determine a learning speed. And a change in weight, or $\Delta$ Wmn, is determined as follows:

$$\Delta Wmn = - \frac{\partial E}{\partial Wmn}$$

A value of the evaluation function E provides a difference between a document accuracy given by the document retrieval system with the query and a value given by the user in view of the retrieval results. In the learning process of the conventional document retrieval system, the value is given from the user to the system as a binary expression of 1 or 0, that is, "1" being set for a searched document when the document is in conformity with the query while "zero" is set when it is not in conformity. The evaluation function E in such a case is provided as follows:

$$E = \begin{cases} (\tfrac{1}{2})(1 - Bi)^2 : \text{in conformity} \\ (\tfrac{1}{2})Bi^2 : \text{not in conformity} \end{cases}$$

In this formula, Bi is the document accuracy for the i-th document among a number of searched documents. However, it is often difficult for the user to make a conclusion only with the binary expression in view of the retrieval results. In general, it is unavoidable that the decision made by the user becomes a vague one, such as "being almost met", "being not well suited", etc. Accordingly, in the document retrieval system of the present invention, it is possible for the user to select a value from among more than two different numerical numbers. "1" is set for a searched document when it has a keyword fully in conformity with the query, "0" is set when the document contains no keyword in conformity, and any other real number between 0 and 1 is set when the document lies in an intermediate place where the user is unable to give a yes-or-no answer. The evaluation function E employed in the document retrieval system of the present invention is expressed as follows.

$$E = (\tfrac{1}{2})(t - Bi)^2$$

In this formula, t is a real number in a range between 0 and 1, which may indicate an intermediate answer given by the user to the document accuracy, and Bi is a document accuracy calculated for the i-th document among a number of documents.

A change in weight ($\Delta$ Wmn) of a keyword connection of the present invention is given as follows:

$$\Delta Wmn = \begin{cases} (t - Bi)(1 - Bi)/(1 - Wmn): & (4) \\ m \epsilon KL(i), n \epsilon QUERY \\ Wmn \neq 1 \\ (t - Bi)[\pi(1 - Wjk)]: & (5) \\ j \epsilon QUERY, k \epsilon KL(i) \\ s.t. (j, k) \neq (m, n) \\ Wmn = 1 \\ 0: \text{others} \end{cases}$$

In this formula, KL(i) represents a set of keywords indexed to the i-th document among a number of documents (the i-th document to which attention is paid), and QUERY shows a set of keywords included in the query. And, j is a keyword element selected from among the set of keywords QUERY and k is a keyword element among the set of keywords KL(i). The calculation of $[\pi (1 - Wjk)]$ in (5) above is carried out for all possible combinations of keyword j and keyword k except for the particular case of (j, k)=(m, n). In this respect, t=1 corresponds to the case where a learning is done as the correct answer to the query and t=0 corresponds to the case involving the wrong answer.

As described in the foregoing, $\Delta$ Wmn is determined. In practice, a modification of the weight of a keyword connection may be carried out for only the cases where the value of $\Delta$ Wmn is not equal to zero. But, if m=n, then the value of the weight is fixed to 1 and therefore a modification of the weight need not be performed in that case.

Figure 2:
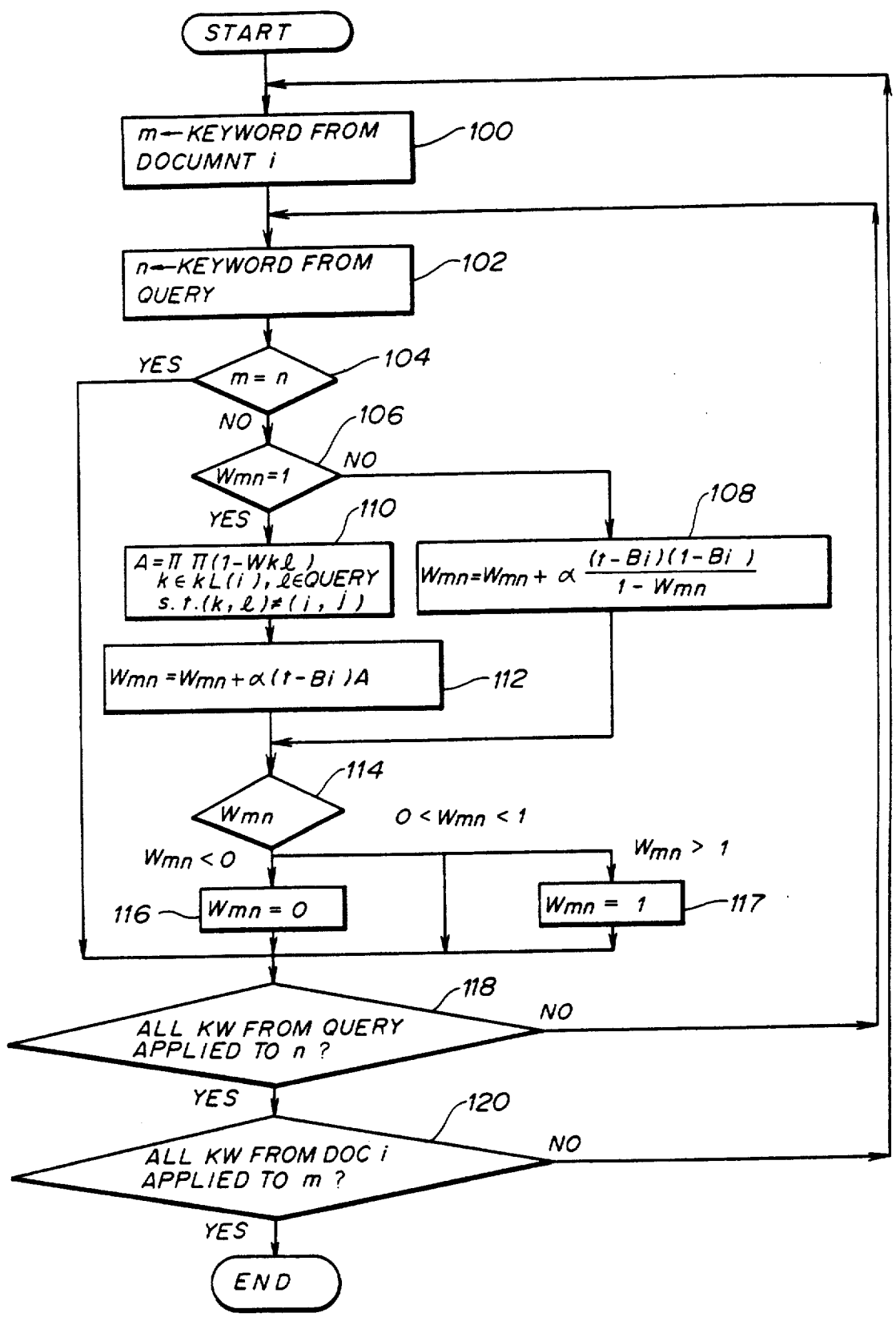
FIG.2 is a flow chart for explaining the learning process employed in the document retrieval system in FIG.1.

Referring now to FIG. 2, a description will be given of a learning process employed in the document retrieval system according to the present invention. In the flow chart shown, a step 100 assumes that a keyword element among a set of keywords indexed to a document "i" is applied to "m", while a step 102 assumes that a keyword element among a set of keywords included in the query is applied to "n". A decision 104 is made on whether the "m" is the same as the "n" or not. When the "m" is equal to the "n", no calculation is carried out and a step 118 is next taken. If the "m" is not equal to the "n", then the next step is a decision 106 which is based on whether the modified weight of the keyword connection, or Wmn in the formula (3) above, is equal to 1 or not. If the Wmn is equal to 1, then the next step is a step 110. If the Wmn is not equal to 1, then the next is a step 108 where a new Wmn is calculated according to the formulas (3) and (4) above.

The step 110 is a calculation of a formula A indicated in FIG. 2, and substituting the formula A calculated into the above formula (5) makes the value of $\Delta$ Wmn. A step 112 determines the value of Wmn according to the formula (3) above. Next, a decision 114 is made on whether the Wmn is smaller than 0 and whether it is greater than 1. If the Wmn is smaller than 0, then the Wmn is set equal to 0 in a step 116. If the Wmn is greater than 1, then the Wmn is set equal to 1 in a step 117. If the Wmn is greater than 0 and smaller than 1, then the Wmn has the same value as that of the Wmn calculated in the step 112.

With the keyword element "m" fixed, a procedure including the steps 102 through 117 is repeated until all the keywords included in the query are applied to the "n". A decision 118 is made about this. If the answer is yes, then a procedure including the steps 100 through 118 is repeated until all the keywords indexed to the document i are applied to the "m". A decision 120 is made on whether the learning process to make the value of the evaluation function smaller is completed.

As described in the foregoing, it is possible for the user to select a value from among multiple choices in view of the retrieval results. The value selected is given in terms of a real number between 0 and 1, allowing the subsequent retrieval results to reflect an intermediate answer involving ambiguous meanings. Also, a document which is initially sought by the user is placed at a higher position of the document database file while another document previously regarded unnecessary is placed at a lower position of the file. This allows an efficient document retrieval. In addition, it is possible for unnecessary keywords which the user no longer uses to be deleted. This helps make for efficient use of a memory device in the system.

Further, the present invention is not limited to this embodiment but various variations and modifications may be made without departing from the scope of the present invention.

What is claimed is:

1. A document retrieval system comprising:

keyword connection table making means for making a keyword connection table which describes a weight of each keyword connection among a first set of keywords from each of documents registered in a database file, and, upon request, the keyword connection table making means acting to update a weight of a keyword connection pre-recorded on a keyword connection table file to make a new keyword connection table containing a modified weight of the keyword connection;

document selection means including means for selecting output documents from the database file by reference to the keyword connection table file, the output documents being in conformity with a query containing a second set of keywords initially given by a user;

document accuracy calculating means for calculating a document accuracy which is obtained with a weight of each keyword connection between a third set of keywords from a document out of the output documents and the second set of keywords from the query when the user modifies a document accuracy of the document, the document accuracy calculating means computing a document accuracy for each of the output documents in a prescribed manner by reference to the keyword connection table;

document sorting means for sorting the output documents in downward sequential order of the document accuracy computed by the document accuracy calculating means;

learning control means for modifying a weight of each keyword connection previously assigned between the third set of keywords from the document and the second set of keywords from the query in a prescribed manner when the user makes an evaluation on whether the document accuracy of the document previously computed by the document accuracy calculating means is in conformity with the query after the output documents are aligned by the document sorting means in downward sequential order of the document accuracy previously computed by the document accuracy calculating means; and means for providing the user with multiple choices of a numerical value between 0 and 1 for each document accuracy of the output documents when the suer inputs an evaluation value to the document retrieval system after making the evaluation on whether the document accuracy of each of the output documents is in conformity with the query, the multiple choices each including binary 0 and 1 representing two distinctly opposed evaluations made by the user with respect to the query, or 0 being not in conformity with the query and 1 being in conformity with the query, the multiple choices each further including any intermediate numerical value between 0 and 1 representing an ambiguous evaluation, made by the user, that cannot be represented by the two distinctly opposed evaluation only.

2. The document retrieval system of claim 1, wherein the document selection means includes:
the document accuracy calculating means,
the document sorting means, and
the learning control means.

3. The document retrieval system of claim 2, wherein the document selection means further includes:
request handling means for handling a request given by the user from a keyboard, the request handling means acting to transfer the query containing the second set of the keywords to the document accuracy calculating means.

4. The document retrieval system as claimed in claim 3, wherein the document selection means further includes:
display control means for allowing retrieval results to be displayed on a display device, the document sorting means acting to transfer the output documents, aligned in downward sequential order of the document accuracy, to the display control means so that the user can look up each of the output documents accompanying a document accuracy on the display device.

5. The document retrieval system of claim 1, further comprising:
request handling means for handling a request from the user to transfer the query containing the second set of the keywords to the document accuracy calculating means; and
display control means for allowing retrieval results to be displayed on a display device;
wherein the document sorting means transfers the output documents, aligned in downward sequential order of the document accuracy, to the display control means so that the user can look up each of the output documents accompanying a document accuracy on the display device; and
wherein the keyword connection table making means, when a request is made by the user, updates the keyword connection table file to make small a difference between a document accuracy initially calculated by the document accuracy calculating means and an evaluation value subsequently given by the user.

6. The document retrieval system of claim 1, wherein:
the document accuracy calculating means computes a document accuracy $B_i$ of a document (i) out of the output documents by calculating an algebraic sum of weights $W_{jk}$ of keyword connections between a set of keywords KL(i) from the document out of the output documents and a set of keywords QUERY from the query given by the user, the algebraic sum of weights $W_{jk}$ being represented by the formula:

$$B_i = 1 - \left\{ \pi_{j \epsilon KL(i)} \pi_{k \epsilon QUERY} (1 - W_{jk}) \right\}$$

where j is a keyword element among the set of keywords KL(i) and k is a keyword element among the set of keywords QUERY.

7. The document retrieval system of claim 1, wherein the document selection means includes:
request handling means for handling a request given by the user from a keyboard, the request handling means transferring the query containing the second set of the keywords to the document accuracy calculating means.

8. The document retrieval system of claim 1, wherein the document selection means includes:
display control means for allowing retrieval results to be displayed on a display device, the document sorting means transferring the output documents, aligned in downward sequential order of the document accuracy, to the display control means so that the user can look up each of the output documents accompanying a document accuracy on the display device.

* * * * *